(12) United States Patent
Paynter

(10) Patent No.: US 9,647,353 B2
(45) Date of Patent: May 9, 2017

(54) METHOD AND APPARATUS FOR FORMING INTERFACE BETWEEN COAXIAL CABLE AND CONNECTOR

(71) Applicant: CommScope Technologies LLC, Hickory, NC (US)

(72) Inventor: Jeffery D. Paynter, Momence, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/272,671

(22) Filed: Sep. 22, 2016

(65) Prior Publication Data

US 2017/0012397 A1 Jan. 12, 2017

Related U.S. Application Data

(63) Continuation-in-part of application No. 15/143,039, filed on Apr. 29, 2016.
(Continued)

(51) Int. Cl.
*B23K 31/00* (2006.01)
*B23K 31/02* (2006.01)
(Continued)

(52) U.S. Cl.
CPC .............. *H01R 9/05* (2013.01); *B23K 1/0016* (2013.01); *B23K 3/0475* (2013.01);
(Continued)

(58) Field of Classification Search
CPC ......... Y10T 29/49123; Y10T 29/49174; Y10T 29/49179; H01R 4/024; H01R 9/05; H01R 43/02; H01B 11/1808
(Continued)

(56) References Cited

U.S. PATENT DOCUMENTS 4,679,723 A * 7/1987 Veit .................... H01R 43/0235
228/168
5,802,710 A 9/1998 Bufanda et al.
(Continued)

FOREIGN PATENT DOCUMENTS

KR 10-1998-0081217 11/1998
KR 10-2006-0026421 3/2006

OTHER PUBLICATIONS

International Search Report and Written Opinion for corresponding PCT Application No. PCT/US2016/025516, date of mailing Jul. 13, 2016, 12 pages.

*Primary Examiner* — Erin Saad
(74) *Attorney, Agent, or Firm* — Myers Bigel, P.A.

(57) ABSTRACT

A method of forming a solder joint between a coaxial cable and a coaxial connector includes the steps of: positioning a solder element between an end of an outer conductor of the coaxial cable and a connector body of the connector, wherein the connector includes an insulator with a suction passage; lowering the connector body and insulator onto a mounting structure; melting the solder element to form a solder joint between the outer conductor and the connector body, the solder joint including a lower surface formed by contact with the insulator and/or the connector body; and applying suction to the melting solder element from a suction source to reduce the formation of bubbles within the solder joint, wherein a suction path between the suction source and the solder element includes the suction passage in the insulator.

16 Claims, 7 Drawing Sheets

Related U.S. Application Data

(60) Provisional application No. 62/160,999, filed on May 13, 2015.

(51) Int. Cl.
| | |
|---|---|
| *B23K 37/04* | (2006.01) |
| *H01R 9/05* | (2006.01) |
| *H01R 4/02* | (2006.01) |
| *B23K 1/00* | (2006.01) |
| *B23K 3/06* | (2006.01) |
| *H01R 43/02* | (2006.01) |
| *B23K 3/047* | (2006.01) |
| *B23K 3/08* | (2006.01) |
| *B23K 101/38* | (2006.01) |
| *B23K 101/32* | (2006.01) |
| *H01R 24/56* | (2011.01) |

(52) U.S. Cl.
CPC ............ *B23K 3/0623* (2013.01); *B23K 3/087* (2013.01); *H01R 4/024* (2013.01); *H01R 43/0207* (2013.01); *B23K 2201/32* (2013.01); *B23K 2201/38* (2013.01); *H01R 24/564* (2013.01)

(58) Field of Classification Search
USPC ................. 29/729, 748, 828; 228/168, 179.1
See application file for complete search history.

(56) References Cited

U.S. PATENT DOCUMENTS

| | | | |
|---|---|---|---|
| 6,667,440 B2 * | 12/2003 | Nelson ............... | H01B 11/1808 174/106 R |
| 7,900,344 B2 | 3/2011 | Ng et al. | |
| 8,984,745 B2 | 3/2015 | Paynter et al. | |
| 2007/0264871 A1 * | 11/2007 | Okano ................. | H01R 4/028 439/578 |
| 2011/0079632 A1 | 4/2011 | Chey et al. | |
| 2014/0034715 A1 | 2/2014 | Cheung et al. | |
| 2014/0201989 A1 | 7/2014 | Paynter et al. | |

* cited by examiner

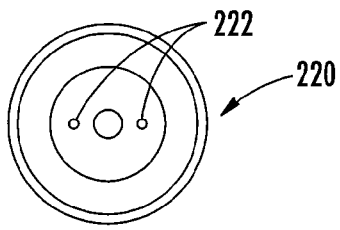
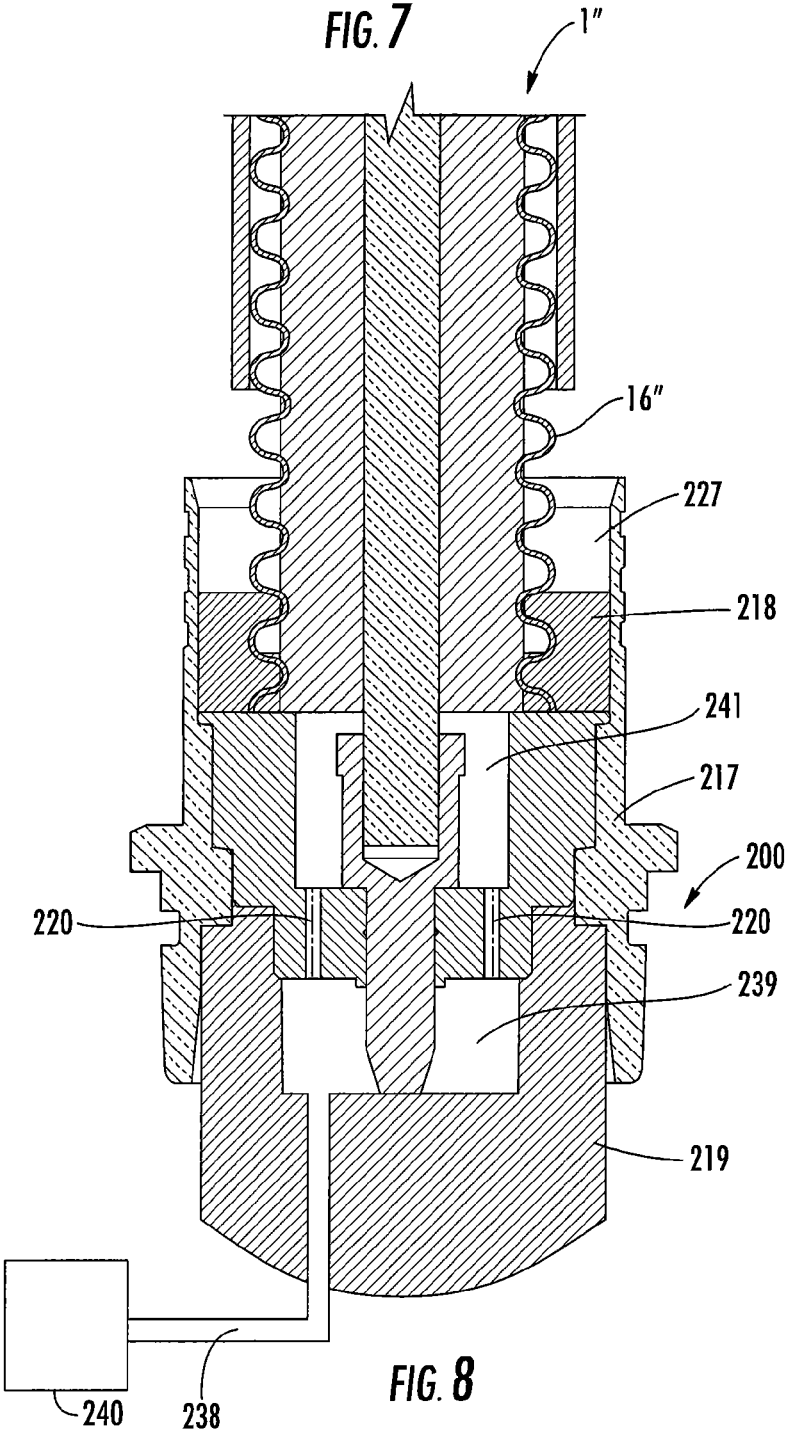

ns United States Patent US 9,647,353 B2

METHOD AND APPARATUS FOR FORMING INTERFACE BETWEEN COAXIAL CABLE AND CONNECTOR

RELATED APPLICATION

This application is a continuation-in-part of and claims priority from U.S. patent application Ser. No. 15/143,039, filed Apr. 29, 2016, which claims priority from and the benefit of U.S. Provisional Patent Application No. 62/160,999, filed May 13, 2015, the disclosure of each of which is hereby incorporated herein in its entirety.

FIELD OF THE INVENTION

The present invention relates generally to a connector and cable interconnection, and more specifically to a connector and cable interconnection method and apparatus with improved manufacturing efficiency and electrical performance characteristics.

BACKGROUND OF THE INVENTION

Coaxial connectors are commonly utilized in RF communications systems. A typical coaxial cable includes an inner conductor, an outer conductor, a dielectric layer that separates the inner and outer conductors, and a jacket that covers the outer conductor. Coaxial cable connectors may be applied to terminate coaxial cables, for example, in communication systems requiring a high level of precision and reliability.

Coaxial connector interfaces provide a connect/disconnect functionality between a cable terminated with a connector bearing the desired connector interface and a corresponding connector with a mating connector interface mounted on an apparatus or on another cable. Typically, one connector will include a structure such as a pin or post connected to an inner conductor and an outer conductor connector body connected to the outer conductor; these are mated with a mating sleeve (for the pin or post of the inner conductor) and another outer conductor connector body of a second connector. Coaxial connector interfaces often utilize a threaded coupling nut or other retainer that draws the connector interface pair into secure electromechanical engagement when the coupling nut (which is captured by one of the connectors) is threaded onto the other connector.

Commonly-owned U.S. Pat. Nos. 5,802,710 and 7,900,344, hereby incorporated by reference in their entireties, disclose a technique for attaching a coaxial connector to a coaxial cable. The connector utilizes an insulating disc retained upon the inner contact and against the dielectric layer and outer conductor of the cable. Induction heating of a solder preform wrapped around the outer conductor creates a molten solder pool in a cylindrical solder cavity formed between the outer conductor, the insulating disc and the connector body. The insulating disc prevents the molten solder from migrating out of the cavity, fouling the connector bore and/or shorting the outer and inner conductors.

Commonly-owned U.S. Patent Publication No. 2014/0201989, also incorporated herein by reference in its entirety, illustrates a pedestal with an insulating seat on which the soldering of the outer conductor to the connector body can occur. One issue that can arise with this technique is the formation of air bubbles within the solder; if such bubbles form in locations along the signal path, the electrical performance of the connector interface can be compromised. Thus, it may be desirable to provide a technique that addresses this shortcoming.

SUMMARY

As a first aspect, embodiments of the invention are directed to a method of forming a solder joint between a coaxial cable and a coaxial connector. The method comprises the steps of: positioning a solder element between an end of an outer conductor of the coaxial cable and a connector body of the connector, wherein the connector includes an insulator with a suction passage; lowering the connector body and insulator onto a mounting structure; melting the solder element to form a solder joint between the outer conductor and the connector body, the solder joint including a lower surface formed by contact with the insulator and/or the insulator; and applying suction to the melting solder element from a suction source to reduce the formation of bubbles within the solder joint, wherein a suction path between the suction source and the solder element includes the suction passage in the insulator.

As a second aspect, embodiments of the invention are directed to a method for attaching a connector to a coaxial cable, comprising the steps of: positioning a solder element between an end of an outer conductor of the coaxial cable and a connector body of the connector, wherein the connector includes an insulator with a suction passage; positioning the connector body and insulator on a mounting structure; melting the solder element to form a solder joint between the outer conductor and the connector body and/or the insulator, the solder joint including a surface formed by contact with the insulator; and applying suction to the melting solder element to prevent the formation of bubbles within the solder joint, wherein a suction path between the suction source and the solder element includes the suction passage in the insulator.

BRIEF DESCRIPTION OF THE DRAWINGS

FIG. 7 is an end view of an insulator included on a connector according to embodiments of the invention.

FIG. 8 is a cross-section of a connector including the insulator of FIG. 7 in a connector body mounted on an interface pedestal as FIG. 5.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
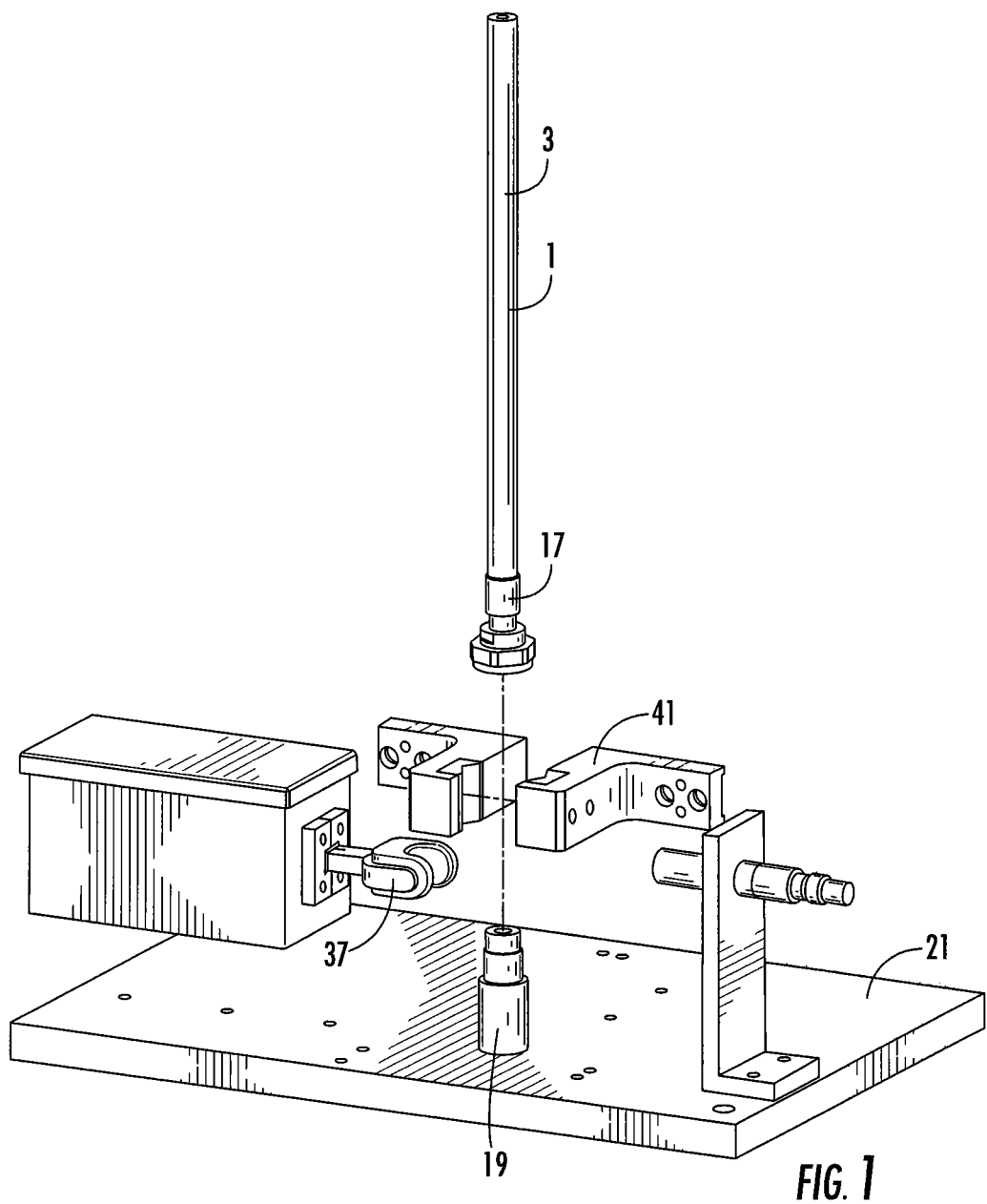
FIG. 1 is a schematic perspective view of a cable-connector assembly apparatus and a cable, wherein electrical interconnections, supporting and enclosure structures are removed for clarity.
Figure 2:
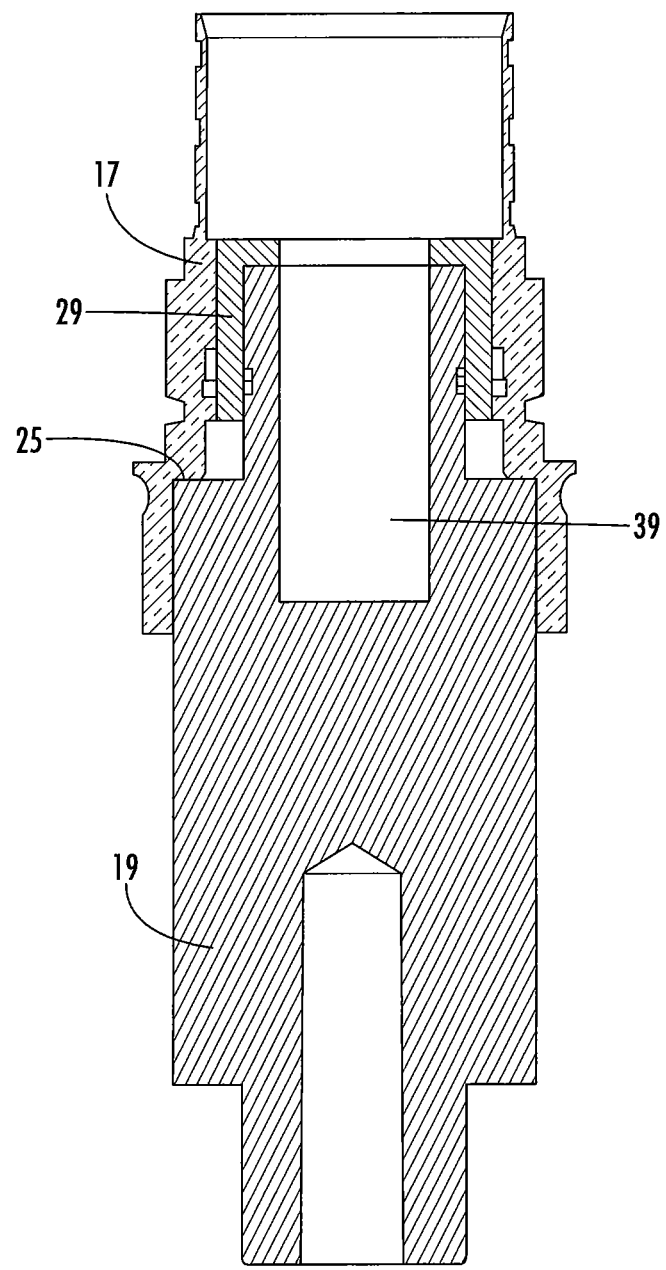
FIG. 2 is a schematic section view of a connector body seated upon the interface pedestal of the apparatus of FIG. 1.

Referring now to the figures, an apparatus 21 for soldering a connector body onto a coaxial cable such as is described in U.S. Patent Publication No. 2014/0201989, supra, is shown in FIG. 1. The apparatus includes a pedestal 19 mounted on a base 21, a clamp 41 for holding a cable 1 in place, and an inductive heating element 37 for heating solder used to attach the connector body to the outer conductor of the cable 1. FIG. 2 shows a connector body 17 in place on the pedestal 19, with a step in the connector body 17 resting on a shoulder 25 of the pedestal 19. A cap 29, formed of a dielectric, thermally insulative material, is mounted on the upper end of the pedestal 19 to provide thermal insulation to components of the cable 1 during soldering. As a result, the pedestal 19 and cap 29 act as a mounting structure for the connector body 17. The pedestal 19 includes an inner conductor cavity 39 in its upper surface that is configured to receive the inner contact 11 of the cable 1 during soldering.

Figure 3:
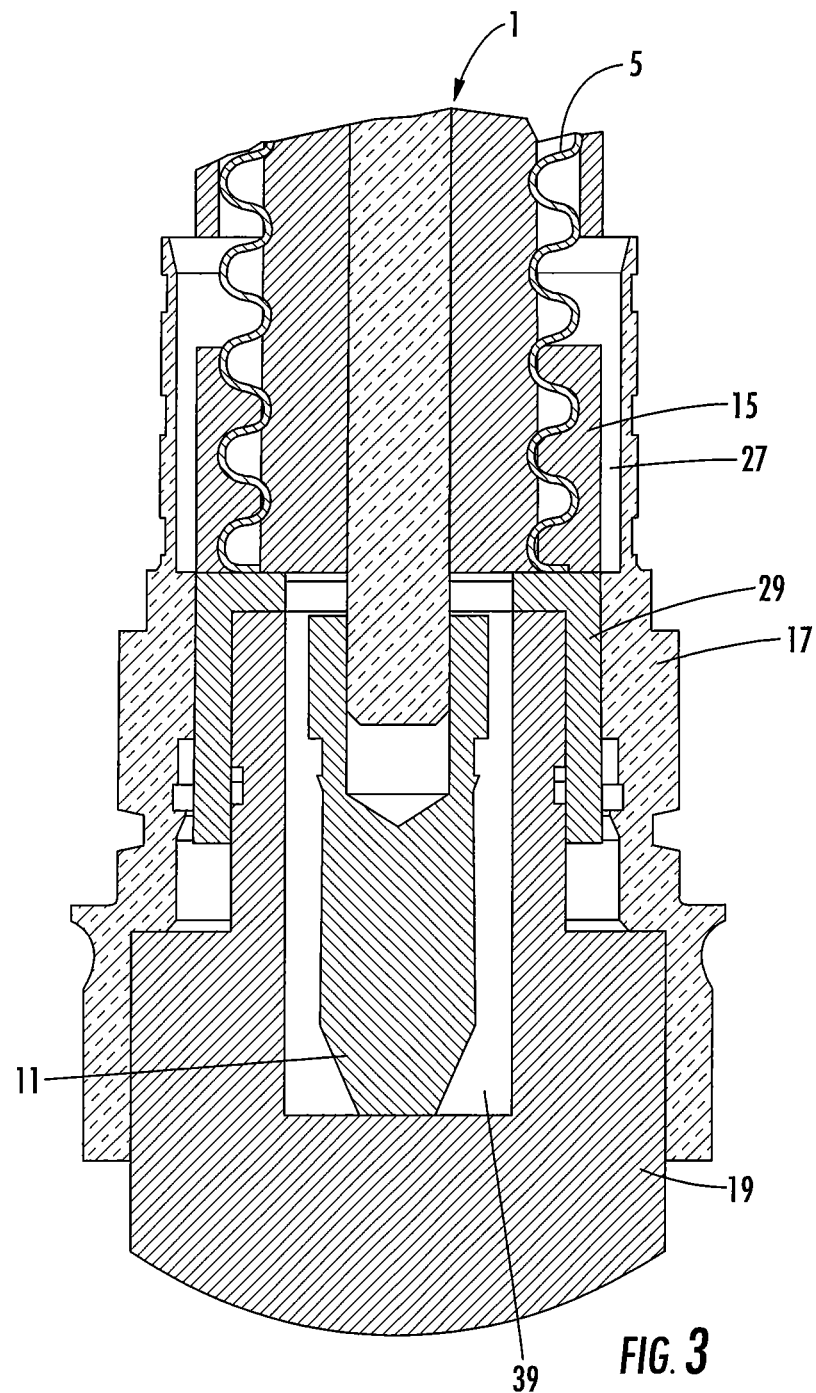
FIG. 3 is an enlarged section view of the pedestal and connector body of FIG. 2 with a cable and solder preform inserted therein for solder interconnection.
Figure 4:
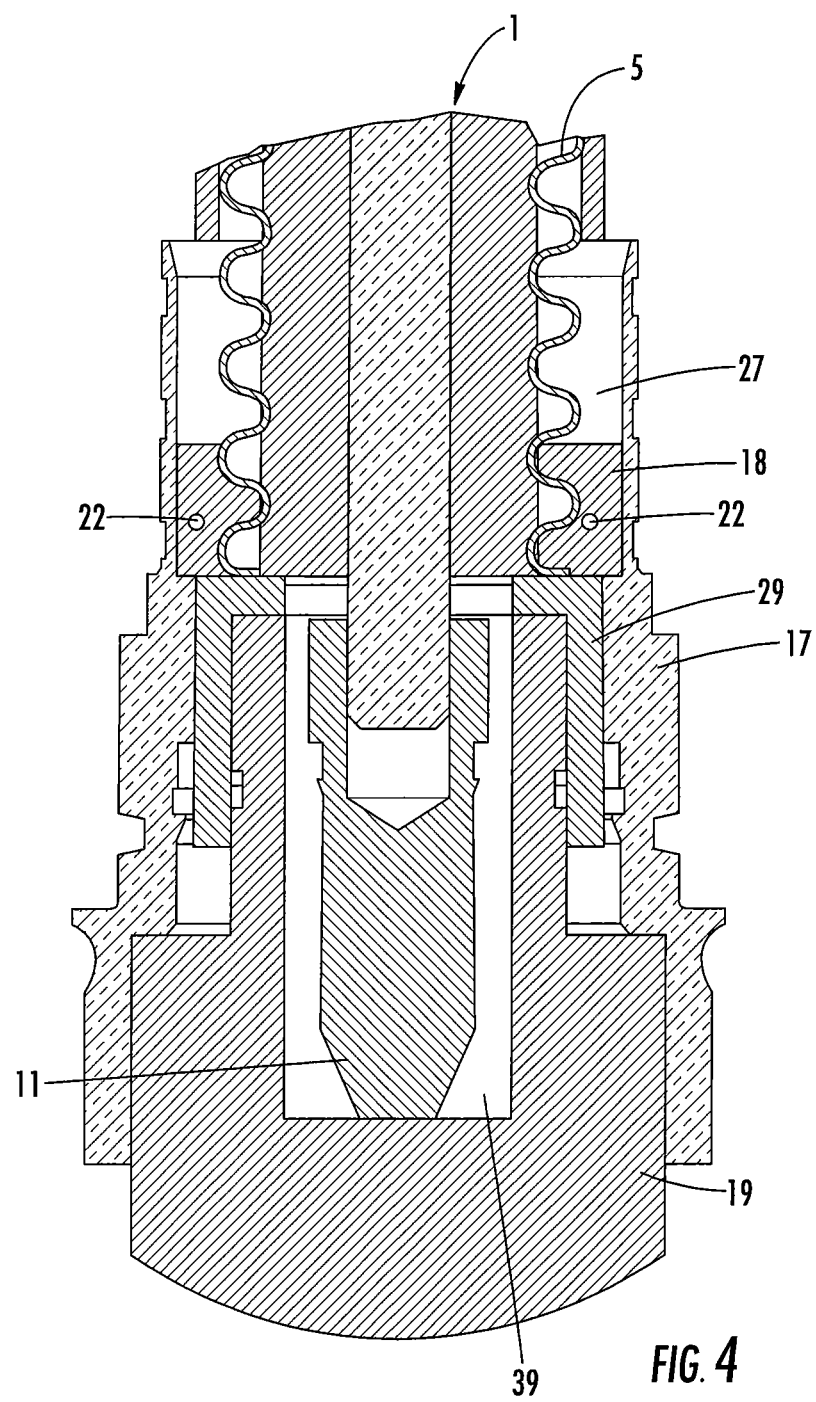
FIG. 4 is a section view as in FIG. 3 with the solder preform melted to form a solder joint.

As shown in FIG. 3, a solder preform 15 or other solder element circumscribes the end of the outer conductor 5 of the cable 1. The connector body 17 is positioned on the pedestal 19, with the solder cavity 27 of the connector body 17 (formed by the inner surface of the connector body 17, the upper surface of the cap 29, and the outer conductor 5) located above the pedestal 19. The cable 1 with the solder preform 15 in place is lowered into the cavity 27 and onto the pedestal 19, with the inner contact 11 of the cable 1 received in the inner conductor cavity 39, and the end of the outer conductor 5 and the solder preform 15 abutting the cap 29. Heat is applied to the end of the cable 1 via the heating element 37, such that the solder preform 15 melts, flows downwardly within the solder cavity 27 between the inner surface of the connector body 17, the upper surface of the cap 29, and the outer conductor 5, and freezes, thereby forming a solder joint 18 between the outer conductor 5 and the connector body 17 (FIG. 4).

As described above, and as shown in FIG. 4, in many instances the flowing solder from the solder preform will create bubbles 22 that remain in the frozen solder joint 18. Such bubbles 22 can adversely impact the electrical performance of the interface between the outer conductor 5 and the connector body 17, particularly if the bubbles 22 are located in the electrical signal path.

Figure 5:
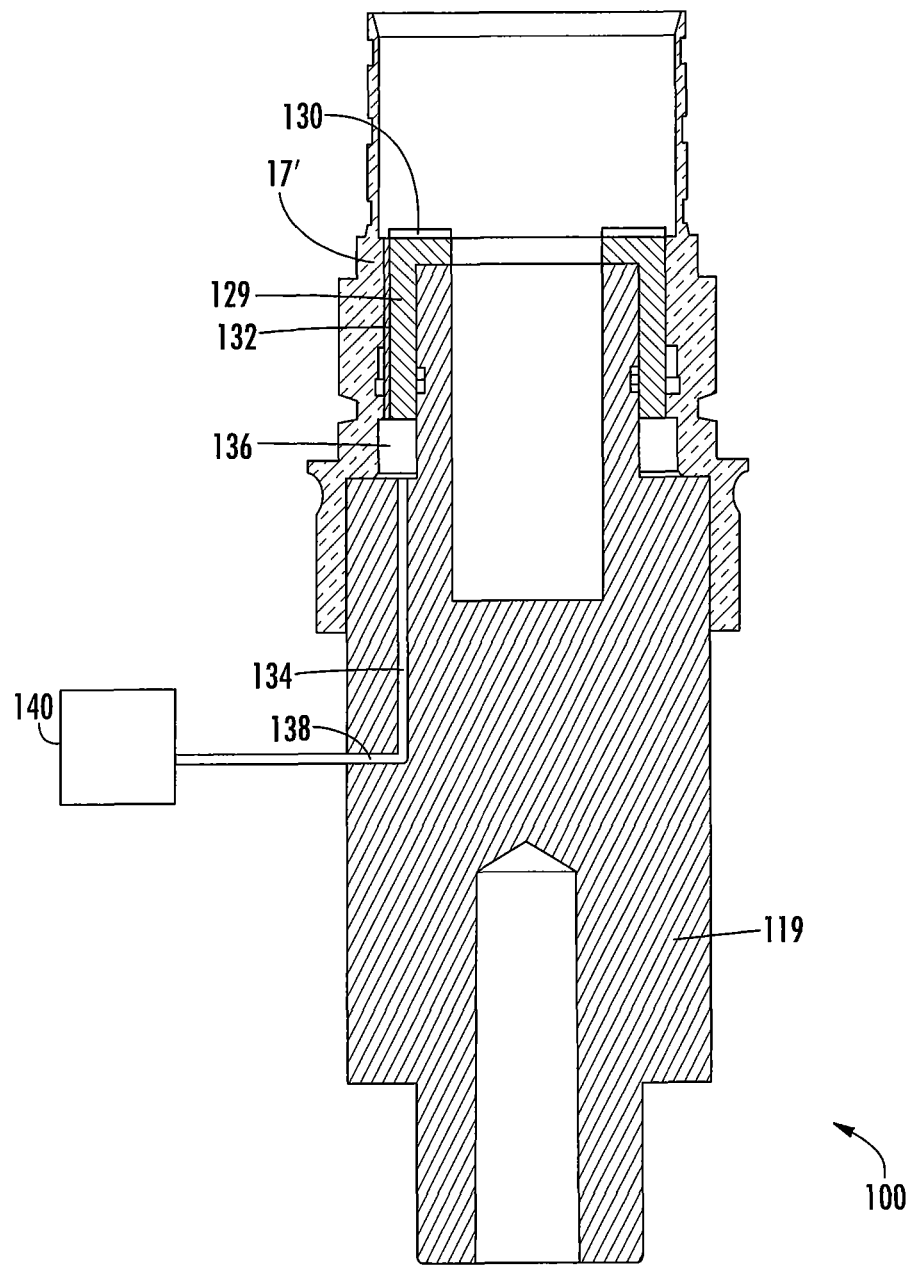
FIG. 5 is a section view of a pedestal and connector body according to embodiments of the invention.
Figure 6:
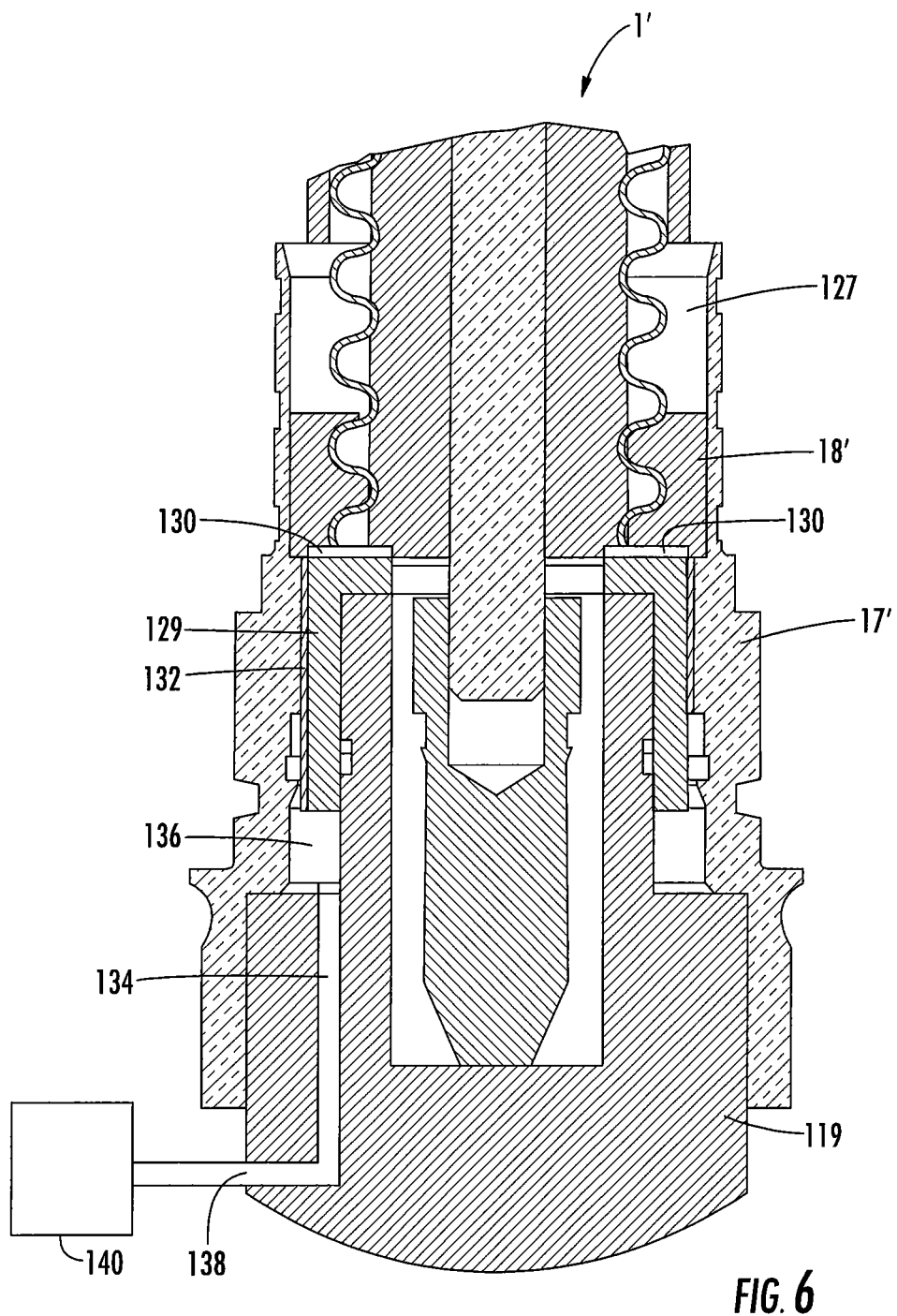
FIG. 6 is an enlarged section view of the pedestal and connector body of FIG. 5 along with a coaxial cable joined to the connector body via a solder joint.

An apparatus that can address the problem introduced by the bubbles 22 is shown in FIGS. 5 and 6. The apparatus 100 includes a pedestal 119 with a cap 129 as described above. However, the upper surface of the cap 129 is covered with a thin membrane 130 that is permeable to air, but is substantially impermeable to solder. Exemplary materials for the thin membrane 130 include woven polytetrafluoroethylene (PTFE). The material selected for the membrane 130 should have sufficient heat resistance that it does not melt at soldering temperatures. In addition, the cap 129 includes one or more vertical grooves 132 in its outer surface such that air channels are formed between the outer surface of the cap 129 and the inner surface of the connector body 17' as the connector body 17' is fitted over the cap 129.

Referring still to FIGS. 5 and 6, the pedestal 119 includes one or more vent holes 134 that originate from an empty space 136 below the lower edge of the cap 129. The vent holes 134 are routed within the pedestal 119 to a vacuum port 138 in the side of the pedestal 119 that attaches to a vacuum source 140.

In operation, the connector body 17' is positioned on the pedestal 119 as described above (see FIG. 5). The cable 1' with the solder preform in place is lowered onto the pedestal 119. As heat is applied to the solder preform via the heating element discussed above, the vacuum source 140 is activated to apply suction to the solder cavity 127 through the vent holes 134, the air channels created by the grooves 132 in the cap 129, and the membrane 130. As such, as the solder preform melts and freezes, air is drawn from the molten solder through the membrane 130, which can prevent the formation bubbles in the solder joint 18' (see FIG. 6). The reduction or elimination of bubbles within the solder joint 18' can improve the consistency of the electrical properties of the solder joint 18', and in turn those of the cable 1' and connector body 17'.

Those skilled in this art will recognize that other variations of the components and techniques described above are possible. For example, the pedestal 119 and/or cap 129 may be replaced with other mounting structures, and in particular with other mounting structures that can help to form a solder cavity with the connector body 17'. The path between the vacuum source 140 and the solder cavity 127 provided by the vent holes 134 may be configured differently, or in some instances vacuum may be provided in another manner (see, e.g., U.S. patent application Ser. No. 15/065,468, filed Mar. 9, 2016, the disclosure of which is hereby incorporated herein in its entirety). Other variations may also be suitable for use herein.

Referring now to FIGS. 7 and 8, another connector, designated broadly at 200, is shown therein. The connector 200 includes a connector body 217 somewhat similar to that discussed above that engages an interface pedestal 219. However, an insulator 220 is positioned in the connector body 217 and rests on the pedestal 219. The insulator 220 includes two through holes 222.

In operation, the connector body 217 with the insulator 220 is positioned on the interface pedestal 219, with a solder preform in placed on the outer conductor 16" of the cable 1". Suction is applied to the interface pedestal 219 as described above (i.e., via the suction source 240 through the vacuum port 238). However, in this instance suction reaches the solder cavity 227 via the through holes 222, which connect the inner conductor cavity 239 with a cavity 241 within the insulator 220). The solder joint 218 forms within the solder cavity 227 with the upper surface of the connector body 217 serving to form one of the surfaces of the solder joint 218.

This modified technique may be particularly suitable for use with connectors the meet the proposed standard set forth in IEC 4.3/10.

Those skilled in this art will appreciate that other configurations may be suitable. For example, the through holes 222 are illustrated as being bored within the body of the insulator 220 to provide a suction passage through the insulator 220 as part of the suction path between the suction source 240 and the solder joint 218. However, in some embodiments a suction passage in the insulator 220 to the solder cavity 227 may be provided by holes, recesses, grooves or the like in the outer diameter of the insulator 220. Alternatively, suction passage to the solder cavity 227 may be achieved by using an insulator with an outer diameter that is slightly less than the inner diameter of the connector body 217. Combinations of these configurations may also be possible (e.g., a small outer diameter for the insulator may be used for half of the thickness of the insulator, and through holes or recesses used for the other half of the thickness).

In addition, in some embodiments a portion of the upper surface of the insulator 220 may contribute to the formation of at least part of the lower surface of the solder joint 218.

Further, in some embodiments the upper surface of the pedestal 219 may be covered with a membrane as described above in connection with the pedestal 119.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

That which is claimed is:

1. A method of forming a solder joint between a coaxial cable and a coaxial connector, comprising the steps of:
    positioning a solder element between an end of an outer conductor of the coaxial cable and a connector body of the connector, wherein the connector includes an insulator with a suction passage;
    lowering the connector body and insulator onto a mounting structure;
    melting the solder element to form a solder joint between the outer conductor and the connector body, the solder joint including a lower surface formed by contact with the insulator and/or the connector body; and
    applying suction to the melting solder element from a suction source to reduce the formation of bubbles within the solder joint, wherein a suction path between the suction source and the solder element includes the suction passage in the insulator.

2. The method defined in claim 1, wherein the suction path includes a passage through the mounting structure.

3. The method defined in claim 2, wherein the mounting structure includes a cap and wherein the suction path passes through the cap.

4. The method defined in claim 1, wherein the suction passage of the insulator comprises through holes in the insulator.

5. The method defined in claim 1, wherein the solder element is a solder preform mounted on the outer conductor of the cable.

6. The method defined in claim 1, wherein the mounting structure is an interface pedestal.

7. The method defined in claim 1, wherein the coaxial cable further comprises an inner conductor, and wherein an inner contact is mounted onto the inner conductor prior to the lowering step, and wherein the mounting structure includes a cavity for receiving the inner contact.

8. The method defined in claim 1, wherein the lower surface of the solder joint is formed by the connector body.

9. A method for attaching a connector to a coaxial cable, comprising the steps of:
    positioning a solder element between an end of an outer conductor of the coaxial cable and a connector body of the connector, wherein the connector includes an insulator with a suction passage;
    positioning the connector body and insulator on a mounting structure;
    melting the solder element to form a solder joint between the outer conductor and the connector body, the solder joint including a surface formed by contact with the insulator and/or the connector body; and
    applying suction to the melting solder element to prevent the formation of bubbles within the solder joint, wherein a suction path between the suction source and the solder element includes the suction passage in the insulator.

10. The method defined in claim 9, wherein the suction path includes a passage through the mounting structure.

11. The method defined in claim 10, wherein the mounting structure includes a cap, and wherein the suction path passes through the cap.

12. The method defined in claim 9, wherein the suction passage of the insulator comprises through holes in the insulator.

13. The method defined in claim 9, wherein the solder element is a solder preform mounted on the outer conductor of the cable.

14. The method defined in claim 9, wherein the mounting structure is an interface pedestal.

15. The method defined in claim 9, wherein the coaxial cable further comprises an inner conductor, and wherein an inner contact is mounted onto the inner conductor prior to the lowering step, and wherein the mounting structure includes a cavity for receiving the inner contact.

16. The method defined in claim 9, wherein the lower surface of the solder joint is formed by the connector body.

* * * * *